No. 883,500. PATENTED MAR. 31, 1908.
E. A. SPERRY.
METHOD OF DETINNING.
APPLICATION FILED JAN. 9, 1907.
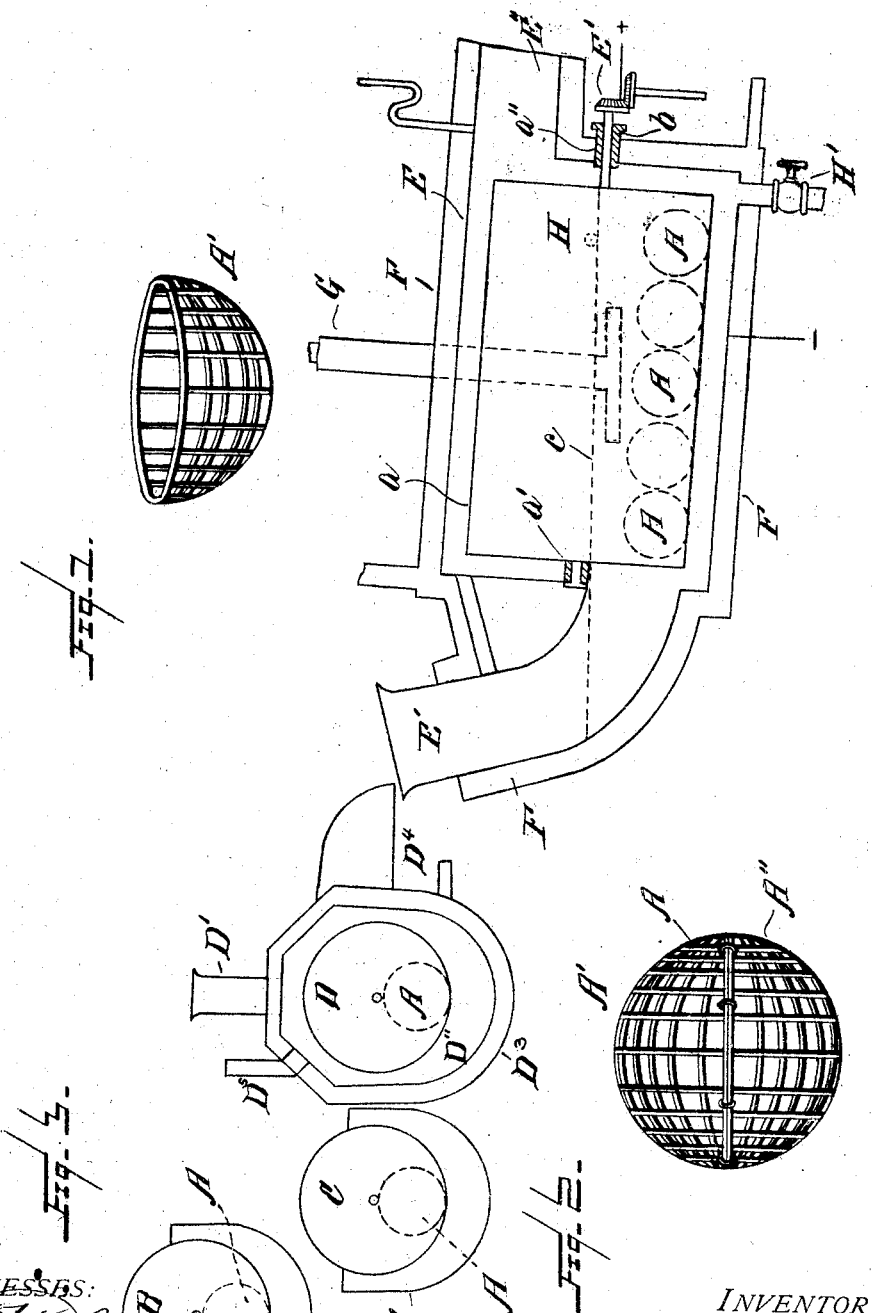
INVENTOR
Elmer A. Sperry.
by
Buckingham & Ewort,
Attorneys

UNITED STATES PATENT OFFICE.

ELMER A. SPERRY, OF BROOKLYN, NEW YORK.

METHOD OF DETINNING.

No. 883,500.　　　　Specification of Letters Patent.　　　Patented March 31, 1908.

Original application filed November 29, 1905, Serial No. 289,581. Divided and this application filed January 9, 1907. Serial No. 351,403.

*To all whom it may concern:*

Be it known that I, ELMER A. SPERRY, a citizen of the United States, residing at Brooklyn, in the county of Kings and State of New York, have invented new and useful Improvements in Methods of Detinning, of which the following is a specification.

My invention relates to a process for detinning tin scrap, cuttings or waste tin plate, and it consists, broadly speaking, in treating such scrap with chlorin or chlorin compounds under conditions designed to secure the most effective and complete removal and recovery of the tin from such scrap either as tin or tin compounds.

It also consists in the preliminary treatment of the scrap and in various steps of treatment of both scrap and product throughout the operation of the process, all of which are peculiar to my process, and which are described in full detail herein, and pointed out in the claims attached hereto and forming a part hereof.

The accompanying drawings serve for purpose of illustrating one form of apparatus with which the process may be carried into effect.

In these drawings Figure 1 illustrates a one-half (½) basket. Fig. 2 is two half baskets, assembled into a spherical package. Fig. 3 represents a diagrammatic view of the steps of the process.

Before going into a detailed description of the process, it may be well to explain that in the successful detinning of tin scrap it is necessary not only to recover the tin but to completely strip the scrap of tin and if possible of all other foreign metals, inasmuch as scrap containing more than .04 per cent. of foreign metal is unfit for purposes of making steel, and therefore of very little value as there is practically no market for impure scrap. Again the surface of the scrap should be attacked or oxidized as little as possible. Again, the process should be as continuous as practicable, in this manner avoiding unnecessary expense for labor.

In the preliminary preparation of the scrap, it may be divided into two classes; cuttings, which is usually from new tin plate, and manufactured scrap, which is for the most part old scrap, such as cans, etc. The first class is put into the retainers or baskets direct. The second class may have previous treatment before being placed into these baskets. This treatment if used consists first in a rough mechanical classification; then heating for melting solder and weakening joints. Third, while hot, dismembering and opening all joints. The last process being preferably done with such violence as to throw off all solder possible, which is recovered. This scrap is then placed in half baskets indicated by A' and A'', which are then brought together in the form of a sphere as indicated by A, Fig. 2.

The baskets are practically made of steel net or wires meridianally disposed and secured to a circular ring at the joint. The rings are detachably secured to each other. The tin scrap or cuttings are now preferably washed in a bath of caustic alkali in tank B, drained and dried in oven D, whereupon they are in readiness to join the other baskets in the farther steps of the operation. In nearly all the steps it is designed to handle these spherical containers filled with scrap automatically, and to this end a number of devices may be employed for rolling or otherwise causing motion to be imparted to these spheres in their transit through the various stages of process. One means that may be employed is a device similar to a hollow revolving screen which is slightly inclined from end to end, upon the revolving of which the spheres introduced at one end gradually work their way to the other, while constantly presenting all their various surfaces and faces to the action and also after having rotated in practically every plane possible.

The rotation is valuable from the fact that especially in some of the steps of the process, such for instance, as drying and evaporating, the universal motion imparted serves to dump and eject any material which would otherwise be trapped and retained in an angle or corner of the scrap as packed or compacted. These revolving screens may be made of iron inasmuch as under the conditions here presented, iron is not attacked by the chemical used in the reactions. After the baskets are dried and preferably while yet hot, they are introduced from the furnace D into the tube E' of the vessel E, in which is a revolving screen $a$, handling the spheres A, A, A, etc., below the surface of the detinning agent C.

In amplification of the above statements and to still further point out the nature and results of the above described preliminary treatment of the scrap, attention should first be called to some further considerations with regard to the character of the scrap, and particularly the character of the manufactured scrap under consideration.

It is known that the first class of scrap pointed out above, which consists in trimmings, cuttings, punch press skeletons, etc., does not constitute more than 8 % to 9 % of the total tin plate utilized in the manufacture of tins and tin plate articles. In many cases where rectangular shapes are employed, such as square cans, can-bodies and similar structures, the percentage of trimmings including the listed edges of the sheets constitute a much smaller percentage than that named above. It is a well known fact that ultimately all or nearly all of the manufactured articles from tin plate deteriorate and are discarded and thus become scrap of the second class named above, and it will also be seen from the percentages discussed, that this class of scrap constitutes by far the most important body to be dealt with in the process of detinning.

Manufactured scrap as such, while it constitutes the largest body, also constitutes the most difficult class to deal with in connection with the detinning processes. Some of the reasons will be apparent from the discussions above relating to the necessary freedom from impurities of the resulting black scrap and also from the further consideration of the multiple impurities, filth, food products, lacquers, oils and greases, paints and labels which are widely distributed upon the surfaces of the cans, both interior and exterior. The lead in the solder also becomes an important impurity to both the black scrap and tin products or tin obtained in the process of detinning, and one which is difficult to eliminate owing to the fact that it is confined in the seams and lock-joints of the cans and containers in a manner rendering its removal difficult. Again, a few cans, and containers, in this country are beginning to appear with a plastic layer rolled and crimped within the end seams of the can, which it is necessary to remove in order to allow full access of the detinning chemicals and re-agents employed in removing the tin. These plastic rings or layers are made up from organic materials, consisting usually of some form of carbohydrate associated with gelatin and formaldehyde. Sometimes parchmentized fiber or fabric is used in and about these joints, and in isolated cases, gum such as rubber is employed. Regardless of the nature of these joint fillers, they should be removed and the spaces employed for admission of the active detinning agent. Furthermore, it is necessary that in the steps of preliminary treatment of the scrap prior to detinning, the various substances found to be associated with the steel other than the tin, should be converted into a state or into a product that will be inert towards the active agents employed in the detinning operation, as well as towards the reaction products so developed or the steel from which the tin and foreign metals have been removed. This application, forming as it does a division of my prior application #289,581, filed November 29th, 1905, is fully illustrated by the drawings employed, and while the above entitled prior application confined itself to the detinning portion of the process as a whole and simply touched upon the preliminary treatment of the scrap, it is the object of the present application to more fully amplify the said preliminary treatment and the steps involved therein, together with materials employed and manipulations involved in such steps of the process. The detinning process which succeeds this treatment may be of any nature, such as the alkaline electrolytic process or the acid process, but the preparation herewith described especially fits the old or manufactured scrap, articles, etc, for chlorin detinning and it is this process which is described and claimed in my prior application, of which this is a division as stated.

It is well known that much of the lacquer, varnish, paint and special lacquer such as is used to line sardine cans, which is made to withstand especially high temperatures, while they will withstand acids, steaming, soda solutions and the like, will not withstand caustic alkali of either the sodium or potassium bases, especially when the solution of either of these salts is applied at an elevated temperature. Thus by the operation largely involving a saponification of the filth and adhering matters, impurities, etc., the scrap becomes free or partially free from these materials and the resulting mass, aside from being subjected to the high temperatures in furnace D, are converted into forms which are inert toward chlorin or any of the chlorin compounds employed in succeeding steps of the process of detinning proper.

As indicated above, scrap may be taken in bulk before being packed into baskets A, made up from the filled half-baskets A', but I find that these spheres, owing to the ease with which they may be moved about and agitated, yield better results on the whole than where the treatment is undertaken in bulk. After being filled and compacted to a more or less degree as stated, these spheres of scrap are introduced in tank B into one end of the revolving perforated cylinder $a$ therein, which by simple revolution upon its axis, causes the spheres to move and owing to the slight inclination of the axis as indicated in the revolving cylinder $a$, journaled at $a'$ and $a''$, the baskets are continually rolling or attempting to roll toward one end, which gives them a universal motion so that all parts are exposed as described. After the baskets have been subjected to this treatment for sufficient length of time to remove and saponify the impurities, many of which are found to be quite fully removed by this operation, they are removed to a similar treating tank C, where the identical mechanism is shown as being employed, where they are first drained from the alkaline solution which is then drawn off from outer tank C' and wherein they are flushed or rinsed, preferably twice, that is, in two waters, when again allowed to drain, whereupon they are in readiness for the furnace D. This furnace is supplied with a chimney D'; practically identical revolving drum mechanism with the other tanks, and may also be supplied with an inner inclosure D'', outside of which is the fire-box $D^3$, supplied by the oil or other burner $D^4$. If the inclosure D'' is used, a separate vent $D^5$ is employed therefor, as indicated in the drawing. The sphere A of scrap is shown within the revolving drum. The scrap after being drained and preferably rinsed and drained in tanks A', is brought to a temperature in the oven or furnace D, suitable for melting the solder and weakening the joints and dismembering, through the jolting and agitation of the rolling spheres as well as through the sudden expansion of the parts. If not entirely dismembered, the joints are so loosened by the removal of the solder or charring or burning out of the plastic mass used as a joint filler, so that they are well suited to the detinning process which immediately follows. The heat here is raised to a point where these operations are found to have been accomplished. It will be understood that the inclosure D'' may be employed for exclusion of oxidizing gases, especially where the temperatures are excessive, but owing to the fact that tin is not an easily oxidized material, I do not find the exclusion of corrosive gases to be extremely essential. It may be considered that for ordinary purposes, a temperature of 350 to 500 centigrade will be sufficient, but to accelerate the operation the furnace may be held at a point considerably higher and the baskets put through more rapidly. This is found to char, shrivel or deteriorate even the most obstinate and refractory materials and when used in the joints and inclosed in the folds of the joints, or such folds as may accidentally occur when the scrap is considerably mutilated and jammed or crushed. Most of these materials are volatilized, the gases escaping through chimney D' or $D^5$, dependent upon the presence or absence of the inclosure D''.

It may be understood that the revolving drums in each of the cases described are perforated and that the solder which is very fluid at the high temperatures, flows away from the scrap through the basket and accumulates in the bottom of the furnace below the flame or in the inclosure D''. It will further be understood that excessive temperatures should be guarded against, as if the temperature is too high, the tin upon the surface will be alloyed with the iron, as is well understood, and the scrap rendered unfit for detinning or other purposes. On the other hand, too low temperatures, the fluxing of the solder is only partial, preventing its free escape from the joints and dislodgment, whereas when the proper temperature is reached, the solder flows freely and through the agitation and complex movements of the baskets, the contents may be easily expelled without spreading over the surfaces of the scrap and alloying with the tin at any particular distance from the joint. Scrap subjected to the treatment described is allowed to cool down to a certain degree before being introduced into the detinning process proper, which is illustrated in the drawing by tank E and furnace with a large tube E', into which the scrap while yet hot is introduced. It is not necessary to describe the successive steps relating to the removal of the tin from the scrap as this has been fully described and claimed in my prior application referred to above. It may, however, be well to say that the baskets A are subjected to the action of chlorin introduced into the jacketed pipe G, preferably in the presence of anhydrous stannic chlorid $c$, which is here shown in a body beneath the surface of which the baskets are submerged, the same mechanism, consisting of the revolving perforated drum $a$, being utilized, and it is the object of the treatment described in detail herein, to render the filth and impurities inert toward both the chlorin and the stannic chlorid. Incidentally it may be stated that lead as such is inert toward both of these materials.

It will readily be understood that some of the details of the processes may be varied and some of the steps altered without departing from the essence of the invention.

I claim:

1. The method of preparing tin scrap, associated in part with foreign matter, for detinning which consists in classifying this scrap, subjecting one of the classes to a saponifying solution and to high temperature, bringing the classes together and introducing them jointly to the detinning process.

2. The method of preparing tin scrap, associated in part with foreign matter, for detinning which consists in classifying this scrap, subjecting one of the classes to a saponifying solution and to high temperature, bringing the classes together, heating same and introducing them jointly to the detinning process while still in a heated state.

3. The method of preparing tin scrap associated with foreign matter for anhydrous detinning which consists in cleaning and highly heating the scrap and then while hot subjecting it to the detinning process proper.

4. The method of preparing tin scrap associated with foreign matter, which consists in subjecting such scrap to treatment in a solution for cleansing same, the solution formed from a substance not removable by the subsequent heating step in the process, treating the scrap for removal of such substance and also to a high temperature preparatory to detinning.

5. The method of preparing tin scrap associated with foreign matter which consists in subjecting such scrap to treatment in a solution for cleansing same, the solution formed from a substance not removable by the subsequent heating step in the process, mechanically cooling or draining the substance from the scrap, then treating the scrap for removal of such substance and also to a high temperature preparatory to detinning.

6. The method of preparing tin scrap associated with foreign matter for detinning, which consists in subjecting such scrap successively to a saponifying solution, a washing or rinsing process for the removal of such solution and at a temperature sufficient for the removal of some of the foreign matter and eliminating that part not so removed, rendering it inert to the detinning agent employed.

7. The method of preparing tin scrap, associated with foreign matter, which consists in packing the scrap into bundles, subjecting such bundles successively to a saponifying solution and to high temperatures while under conditions of motion or agitation, preparatory to detinning.

8. The method of preparing tin scrap, associated with foreign matter, which consists in packing the scrap into bundles, subjecting such bundles successively to a saponifying solution and to high temperatures while under conditions of motion or agitation in each step, preparatory to detinning.

9. The method of preparing tin scrap, associated with foreign matter for anhydrous detinning, which consists in subjecting such scrap to a high temperature and then to the anhydrous detinning process while still in a heated state.

10. The method of preparing tin scrap associated with foreign matter for anhydrous detinning which consists in bundling the scrap and subjecting such bundles to a high temperature and then to the detinning process proper while still in a heated state.

11. The method of preparing tin scrap associated with foreign matter which consists in bundling the scrap, cleaning and highly heating such scrap in a gaseous medium for drying same, and then while hot subjecting the bundles to the detinning process proper.

In testimony whereof I have hereunto set my hand in presence of two subscribing witnesses.

ELMER A. SPERRY.

Witnesses:
WILLIAM F. DUTTON,
L. A. WELLES.